(12) United States Patent
Chao et al.

(10) Patent No.: US 11,206,413 B2
(45) Date of Patent: Dec. 21, 2021

(54) PALETTE PREDICTOR UPDATES FOR LOCAL DUAL TREES

(71) Applicant: QUALCOMM Incorporated, San Diego, CA (US)

(72) Inventors: Yung-Hsuan Chao, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/991,448

(22) Filed: Aug. 12, 2020

(65) Prior Publication Data
US 2021/0051336 A1    Feb. 18, 2021

Related U.S. Application Data

(60) Provisional application No. 62/886,288, filed on Aug. 13, 2019.

(51) Int. Cl.
*H04N 19/176* (2014.01)
*H04N 19/169* (2014.01)
*H04N 19/174* (2014.01)

(52) U.S. Cl.
CPC ......... *H04N 19/176* (2014.11); *H04N 19/174* (2014.11); *H04N 19/1883* (2014.11)

(58) Field of Classification Search
USPC ................................................. 375/240.24
See application file for complete search history.

(56) References Cited

U.S. PATENT DOCUMENTS 9,558,567 B2 * 1/2017 Guo ..................... H04N 19/186
2015/0341635 A1 * 11/2015 Seregin .................. H04N 19/91
375/240.16

(Continued)

OTHER PUBLICATIONS

Chao Y-H., et al., "CE8-2.1: Palette Mode in HEVC", JVET-O0119, 15th JVET Meeting, Jul. 3, 2019-Jul. 12, 2019, Gothenburg, (The Joint Video Exploration Team of ISO/IEC JTC1/SC29/WG11 and ITU-TSG.16 WP 3), No. JVET-O0119, Jul. 9, 2019 (Jul. 9, 2019), XP030218670, 7 Pages, Retrieved from the Internet: URL: http://phenix.int-evry.fr/ivet/doc_end_user/documents/15_Gothenburg/wg11/JVET-O0119-v3.zip JVET-O0119-v3/JVET-O0119-WD-v2.docx, JVET-O0119-V3, [retrieved on Jul. 9, 2019].

(Continued)

*Primary Examiner* — Behrooz M Senfi
(74) *Attorney, Agent, or Firm* — Polsinelli LLP

(57) ABSTRACT

Systems, methods, and computer-readable storage media for maintaining palette predictors for palette coding are described. An example method can include determining a current palette coding block of a single tree coded slice of a picture is encoded according to a local dual tree; determining, after an update of a palette predictor associated with the current palette coding block, a first number of palette predictor entries for a first image component of the current palette coding block and a second number of palette predictor entries for a second image component of the current palette coding block; determining the first number of palette predictor entries is greater than the second number of palette predictor entries; and based on the first number being greater than the second number, modifying the updated palette predictor to include a same number of palette predictor entries for the first and second image component.

30 Claims, 10 Drawing Sheets

(56) References Cited

U.S. PATENT DOCUMENTS

| | | | |
|---|---|---|---|
| 2015/0341655 A1* | 11/2015 | Joshi | H04N 19/50 |
| | | | 375/240.16 |
| 2015/0341660 A1* | 11/2015 | Joshi | H04N 19/186 |
| | | | 375/240.03 |
| 2015/0341673 A1* | 11/2015 | Joshi | H04N 19/93 |
| | | | 375/240.12 |
| 2015/0341674 A1* | 11/2015 | Seregin | H04N 19/186 |
| | | | 375/240.12 |
| 2017/0127058 A1* | 5/2017 | Misra | H04N 19/126 |
| 2020/0092546 A1* | 3/2020 | Ye | H04N 19/105 |
| 2020/0382799 A1* | 12/2020 | Chernyak | H04N 19/70 |
| 2020/0404283 A1* | 12/2020 | Pham Van | H04N 19/176 |

OTHER PUBLICATIONS

International Search Report and Written Opinion—PCT/US2020/046147—ISA/EPO—dated Nov. 3, 2020.
Liao R.L., (Alibaba-Inc): et al., "CE2-Related: Palette Mode for Non 4:4:4 Color Format", 17. JVET Meeting, Jan. 7, 2020-Jan. 17, 2020, Brussels, (The Joint Video Exploration Team of ISO/IEC JTC1/SC29/WG11 and ITU-TSG.16 ), No. JVET-Q0504, Jan. 1, 2020 (Jan. 1, 2020). XP030223732, 6 pages, Retrieved from the Internet: URL: http://phenix.int-evry.fr/jvet/doc_end_user/documents/17_Brussels/wg11/JVET-Q0504-v1.zip. JVET-Q0504-v1.docx [retrieved on Jan. 1, 2020] section 8.4.5.3.

* cited by examiner

800

DETERMINE A CURRENT PALETTE CODING BLOCK OF A SINGLE TREE CODED SLICE OF A PICTURE IS ENCODED ACCORDING TO A LOCAL DUAL TREE
802

DETERMINE, AFTER AN UPDATE OF A PALETTE PREDICTOR ASSOCIATED WITH THE CURRENT PALETTE CODING BLOCK, A FIRST NUMBER OF PALETTE PREDICTOR ENTRIES FOR A FIRST IMAGE COMPONENT OF THE CURRENT PALETTE CODING BLOCK AND A SECOND NUMBER OF PALETTE PREDICTOR ENTRIES FOR A SECOND IMAGE COMPONENT OF THE CURRENT PALETTE CODING BLOCK
804

DETERMINE THE FIRST NUMBER OF PALETTE PREDICTOR ENTRIES IS GREATER THAN THE SECOND NUMBER OF PALETTE PREDICTOR ENTRIES
806

MODIFY THE UPDATED PALETTE PREDICTOR TO INCLUDE A SAME NUMBER OF PALETTE PREDICTOR ENTRIES FOR THE FIRST IMAGE COMPONENT AND THE SECOND IMAGE COMPONENT
808

FIG. 8

PALETTE PREDICTOR UPDATES FOR LOCAL DUAL TREES

CROSS-REFERENCE TO RELATED APPLICATIONS

This application claims the benefit of U.S. Provisional Application No. 62/886,288, filed Aug. 13, 2019, entitled "PALETTE PREDICTOR UPDATE FOR LOCAL DUAL TREE IN VIDEO CODING", which is hereby incorporated by reference in its entirety and for all purposes.

TECHNICAL FIELD

This application is related to video coding and, more specifically, to systems and methods for performing palette predictor updates for local dual trees in video coding.

BACKGROUND

Many devices and systems allow video data to be processed and output for consumption. Digital video data generally includes large amounts of data to meet the demands of video consumers and providers. For example, consumers of video data typically prefer or desire videos of high quality, fidelity, resolution, frame rates, and the like. As a result, the large amount of video data that is required to meet these demands places a burden on communication networks and devices that process and store the video data.

Various video coding techniques may be used to compress video data. The video coding techniques can be performed according to one or more video coding standards. Example video coding standards that can be used for video coding include high-efficiency video coding (HEVC), advanced video coding (AVC), MPEG-2 Part 2 coding (MPEG stands for moving picture experts group), VP9, Alliance of Open Media (AOMedia) Video 1 (AV1), Essential Video Coding (EVC), Versatile Video Coding (VVC), or the like. To compress video data, video coding generally utilizes prediction methods (e.g., inter-prediction, intra-prediction, or the like) that take advantage of redundancy present in video images or sequences. One example goal of video coding is to compress video data into a form that uses a lower bit rate, while avoiding or minimizing degradations in video quality. With the increasing availability of ever-evolving video services, encoding techniques with improved coding accuracy and/or efficiency are needed.

BRIEF SUMMARY

Disclosed are systems, methods, and computer-readable media for managing palette predictor updates when implementing local dual trees and addressing conflicts between the palette predictors and local dual trees. According to at least one example, a method is provided for managing palette predictor updates. An example method can include determining a current palette coding block of a single tree coded slice of a picture is encoded according to a local dual tree; determining, after an update of a palette predictor associated with the current palette coding block, a first number of palette predictor entries for a first image component of the current palette coding block and a second number of palette predictor entries for a second image component of the current palette coding block; determining the first number of palette predictor entries is greater than the second number of palette predictor entries; and based on the determining that the first number of palette predictor entries is greater than the second number of palette predictor entries, modifying the updated palette predictor to include a same number of palette predictor entries for the first image component and the second image component.

According to at least one example, a non-transitory computer-readable medium is provided for managing palette predictor updates. An example non-transitory computer-readable medium can include instructions stored thereon which, when executed by one or more processors, cause the one or more processors to determine a current palette coding block of a single tree coded slice of a picture is encoded according to a local dual tree; determine, after an update of a palette predictor associated with the current palette coding block, a first number of palette predictor entries for a first image component of the current palette coding block and a second number of palette predictor entries for a second image component of the current palette coding block; determine the first number of palette predictor entries is greater than the second number of palette predictor entries; and based on the determining that the first number of palette predictor entries is greater than the second number of palette predictor entries, modify the updated palette predictor to include a same number of palette predictor entries for the first image component and the second image component.

According to at least one example, an apparatus is provided for managing palette predictor updates. An example apparatus can include memory and one or more processors coupled to the memory, the one or more processors being configured to determine a current palette coding block of a single tree coded slice of a picture is encoded according to a local dual tree; determine, after an update of a palette predictor associated with the current palette coding block, a first number of palette predictor entries for a first image component of the current palette coding block and a second number of palette predictor entries for a second image component of the current palette coding block; determine the first number of palette predictor entries is greater than the second number of palette predictor entries; and based on the determining that the first number of palette predictor entries is greater than the second number of palette predictor entries, modify the updated palette predictor to include a same number of palette predictor entries for the first image component and the second image component.

According to at least one example, another apparatus is provided for managing palette predictor updates. The apparatus can include means for determining a current palette coding block of a single tree coded slice of a picture is encoded according to a local dual tree; determining, after an update of a palette predictor associated with the current palette coding block, a first number of palette predictor entries for a first image component of the current palette coding block and a second number of palette predictor entries for a second image component of the current palette coding block; determining the first number of palette predictor entries is greater than the second number of palette predictor entries; and based on the determining that the first number of palette predictor entries is greater than the second number of palette predictor entries, modifying the updated palette predictor to include a same number of palette predictor entries for the first image component and the second image component.

In some aspects, the method, non-transitory computer-readable medium, and apparatuses described above can determine, prior to modifying the updated palette predictor, the local dual tree associated with the current palette coding block corresponds to the first image component.

In some examples, modifying the updated palette predictor can include adding, to the updated palette predictor, one or more palette predictor entries for the second image component, the one or more palette predictor entries including one or more component values calculated for the second image component.

In some aspects, the method, non-transitory computer-readable medium, and apparatuses described above can calculate the one or more component values for the second image component by left shifting a first integer by a second integer, the second integer including a result of a bit depth value for a sample from the current palette coding block minus a third integer. In some examples, each of the first integer and the third integer equals 1, and left shifting the first integer by the second integer includes raising 2 to a power of an exponent including the second integer.

In some examples, the first image component includes color components from a first color channel, and the second image component includes color components from a second color channel that is different from the first color channel.

In some cases, modifying the updated palette predictor includes clipping the updated palette predictor to remove one or more palette predictor entries for the first image component.

In some aspects, the method, non-transitory computer-readable medium, and apparatuses described above can determine a different palette coding block of the single tree coded slice is encoded according to a respective local dual tree; and based on the determining the different palette coding block is encoded according to the respective local dual tree, skip a palette predictor update for the different palette coding block.

In some examples, the palette predictor includes a joint palette predictor that includes the first number of palette predictor entries for the first image component and the second number of palette predictor entries for the second image component.

In some examples, the palette predictor includes a first palette predictor associated with the first image component and a second palette predictor associated with the second image component.

In some aspects, the method, non-transitory computer-readable medium, and apparatuses described above can generate the palette predictor based on a set of values in a current palette associated with the current palette coding block. In some aspects, the method, non-transitory computer-readable medium, and apparatuses described above can determine the current palette based on one or more reused values from a previous palette predictor and one or more values associated with the current palette coding block. In some examples, the one or more reused values are determined based on signaled information comprising reuse indicators.

In some aspects, the apparatuses described above can be or can include a mobile device (e.g., a mobile telephone or so-called "smart phone" or other mobile device), a smart wearable device, an extended reality device (e.g., a virtual reality (VR) device, an augmented reality (AR) device, or a mixed reality (MR) device), a personal computer, a laptop computer, a server computer, or other device. In some aspects, the apparatuses described above can be or can include a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 8 is a flowchart illustrating an example of a process for managing palette predictor updates, in accordance with some examples;

DETAILED DESCRIPTION

Figure 1:
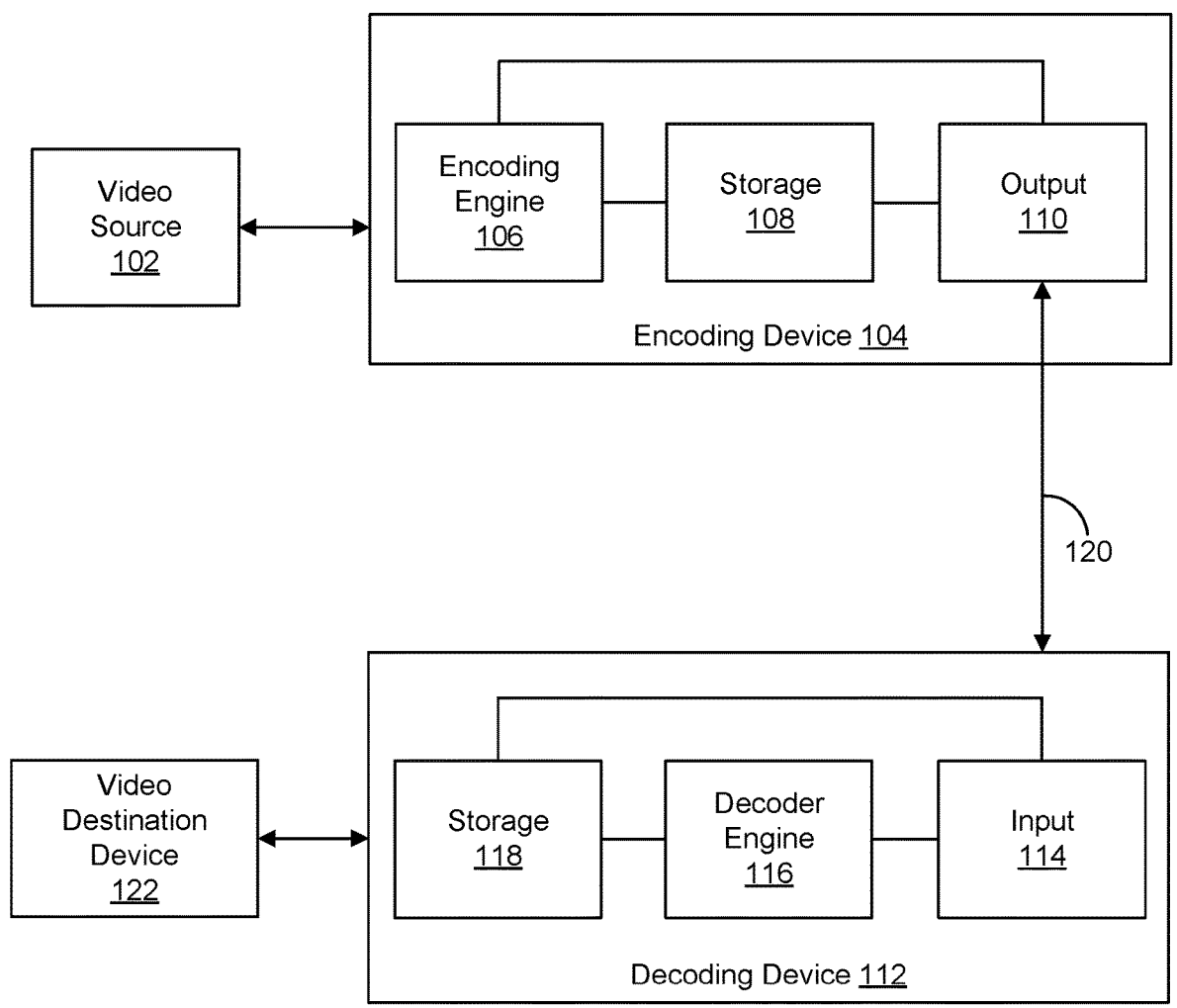
FIG. 1 is a block diagram illustrating an example encoding device and an example decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. In some examples, video compression techniques can apply different prediction modes to remove and/or leverage redundancies in video data. Example prediction modes can include spatial prediction (e.g., intra-frame prediction or intra-prediction), temporal prediction (e.g., inter-frame prediction or inter-prediction), inter-layer prediction (across different layers of video data), palette prediction, and/or other prediction techniques to reduce, remove, and/or leverage redundancy in video sequences. A video encoder can partition each picture of a video sequence into regions referred to as video blocks or coding units (described in greater detail below). These video blocks may be encoded using a particular prediction mode.

Video blocks can be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit (CU), prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some examples, palette coding (or palette mode), which is a color-based prediction method, can be used to increase compression efficiency by exploiting the redundancy among similar pixel values and/or local repetitive pixel patterns in a picture or frame. For example, in palette coding, the pixels of a coding block can be classified into a list of colors. Each color in the list can be a representative color, which can include colors having a certain (e.g., high) frequency of occurrence in the block. A color index table called a "palette" can be generated for each palette coded block. Each index entry can be mapped to a color value (e.g., a luminance component value, a Cb chrominance component value, a Cr chrominance component value, etc.). Palette entries for a block can be coded using a palette predictor. For each entry in the palette predictor, a reuse flag can be signaled to indicate whether that entry should be used in the current palette. Any reused entries can be added to the current palette. The number and color values of entries in the palette that are not in the palette predictor can be signaled and/or derived from the current block. After decoding a palette coded block, the palette predictor can be updated for the next palette coded block. In some examples, the palette predictor can be updated based on one or more entries in the current palette.

When first adopted, palette mode was restricted to chroma format YUV4:4:4. To code the palette table, for the non-wavefront case, palette predictors are maintained and initialized at the beginning of each slice where the palette predictor is reset to 0. However, in VVC, dual tree was introduced for I slices (intra-predicted, independently decodable). In dual tree, separate partition trees are used for luma and chroma. To address the introduction of dual trees, some adjustments were done in the adopted palette in VVC. For slices using dual tree, separate palette tables are maintained for luma (e.g., Y component) and chroma (e.g., Cb and Cr components). For slices using single tree, a single palette predictor containing both luma and chroma components are maintained for each frame (e.g., in the non-wavefront case). For the coding unit coded with palette mode, a reuse flag can be signaled for each entry in the corresponding palette predictor to indicate whether it is part of the current palette table of the coding unit. In some examples, the reuse flags can be sent using run-length coding of zeros. The palette predictor can be updated after the coding unit using the palette table associated with the coding unit and, in some cases, one or more un-reused entries in the previous palette predictor.

Certain coding schemes, such as VVC, support separate tree structures (e.g., dual tree) for coding luminance (or luma) and chrominance (or chroma) components and/or partitioning corresponding blocks. For example, for P slices (uni-directional predicted) and B slices (bi-directional predictive), the luma and chroma coding tree blocks (CTBs) in a CTU can share the same coding tree structure. However, for I slices (intra-predicted, independently decodable), the luma and chroma CTBs can have separate block tree structures. When a separate block tree mode is applied, a luma CTB is partitioned into CUs by one coding tree structure, and chroma CTBs are partitioned into chroma CUs by another coding tree structure. A CU in an I slice may include a coding block of the luma component or coding blocks of two chroma components, and a CU in a P or B slice includes coding blocks of all three color components, unless the video is monochrome.

Moreover, certain coding schemes may implement minimum size restrictions for CUs in order to prevent inefficiencies and/or other problems that may arise when using CUs below a certain size. In many video encoders and decoders, processing throughput can drop when a picture has smaller intra blocks and/or a greater number of small intra blocks due to sample processing data dependencies between neighboring intra blocks. In HEVC, the smallest intra CU is 8×8 luma samples. The luma component of the smallest intra CU can be further divided into four 4×4 luma intra prediction units. However, the chroma components of the smallest intra CU cannot be further divided. Accordingly, the worst case processing throughput can occur when 4×4 chroma intra blocks or 4×4 luma intra blocks are processed. In VVC, in order to improve the worst case processing throughput, chroma intra CBs smaller than 16 chroma samples (e.g., 2×2, 4×2, and 2×4) and chroma intra CBs with a width smaller than 4 chroma samples (e.g., 2×N) are disallowed by constraining the partitioning of chroma intra CBs.

For example, in single coding trees, a smallest chroma intra prediction unit (SCIPU) is defined as a coding tree node that has a chroma block size that is larger than or equal to 16 chroma samples and has at least one child luma block smaller than 64 luma samples. In each SCIPU, all CBs must generally be of either inter prediction mode or non-inter prediction mode (e.g., intra prediction or intra-block copy prediction). Moreover, chroma blocks of non-inter prediction SCIPUs may not be further divided, while luma blocks of the SCIPUs can be further divided. In this way, the size of the smallest chroma intra CBs is constrained to 16 chroma samples, and 2×2, 2×4, and 4×2 chroma CBs are removed.

Moreover, in palette coding, local dual trees (e.g., chroma and luma trees) can be used to disallow chroma intra CBs below a certain size, such as smaller than 16 chroma samples, by constraining the partitioning of chroma intra CBs. For example, with local dual trees, chroma blocks with 2×2, 4×2, and 2×4 sizes are removed through partitioning restrictions. The local dual trees can be used for small blocks in slices coded using a single coding tree, such as non-intra slices having dual tree enabled in a sequence parameter set (SPS). However, the local dual trees can cause conflicts with palette predictor maintenance (e.g., when updating and/or maintaining the palette predictor used for palette coding.

For example, before local dual trees were adopted, a single palette predictor was maintained for both luma (e.g., Y) and chroma (e.g., Cb and Cr) components. In other words, the palette predictor contained the same number of luma components and chroma components in non-intra slices. On the other hand, with local dual trees, palette coding is applied separately for luma and chroma CUs within the CB. This can result in different palette table/index sizes for luma and chroma CUs. When the palette predictor is updated after palette coding a CB using local dual tree, the palette predictor update may result in different palette predictor sizes for luma and chroma components in the palette predictor. The different palette predictor sizes can cause a number of problems for any subsequent palette coded blocks where local dual tree is not applied.

To illustrate, as noted above, for blocks and/or slices using dual tree, palette predictors can be maintained separately for luma and chroma components while, for blocks and/or slices using single tree, a single palette predictor containing both luma and chroma components can be maintained. Accordingly, when updating palette predictors after coding blocks using dual tree, the updates can result in palette predictors having different sizes. For example, the updates can result in palette predictors having more entries for one color component than another (e.g., more luma entries than chroma entries or vice versa). The palette predictor size conflicts can create errors, failures, and/or other problems when coding blocks using palette predictors with size conflicts. In some examples, a decoding device may expect, and/or attempt to access, the same number of luma and chroma entries in a palette predictor(s). If the palette predictor(s) has more luma entries than chroma entries and the decoding device attempts to access the same number of luma and chroma entries (and associated color values), the decoding device may crash or fail when attempting to access chroma information that does not exist in the palette predictor, or may access the wrong information (e.g., the decoding device may access luma information when attempting or expecting to access chroma information).

In some examples, one or more systems and methods for palette coding are directed to updating palette predictors for local dual trees. In some cases, the approaches disclosed herein can prevent, resolve, and/or address conflicts and problems associated with palette predictor updates when using local dual trees. For example, the approaches disclosed herein can prevent and/or correct different palette predictor sizes when using local dual trees. In some examples, the approaches disclosed herein can ensure that palette predictor updates when using local dual trees do not result in different palette predictor sizes for different components, such as luma and chroma. In some cases, if a palette predictor update results in more palette predictor entries for one component (e.g., luma or chroma), the updated palette predictor can be clipped to ensure the same number of palette predictor entries for luma and chroma. In other cases, if a palette predictor update results in more palette predictor entries for one component (e.g., luma or chroma), the updated palette predictor can be padded using one or more calculated and/or predefined values to ensure the same number of palette predictor entries for luma and chroma.

One illustrative example approach for addressing conflicts between palette predictor updates and local dual trees can include bypassing a predictor update for blocks using local dual tree. For example, for blocks (e.g., CUs, CBs, etc.) using local dual tree in a single tree coded slice, a palette predictor update is bypassed after palette coding. Thus, the palette predictor for the next palette coded block will be the same as the palette predictor used for the current palette coded block. By doing so, the number of luma elements (e.g., luma palette entries) in the palette predictor will be the same as the number of chroma elements in the palette predictor throughout the whole single tree coded slice. For palette table derivation, chroma blocks only access chroma components (e.g., Cb and Cr) in the palette predictor (which can contain luma and chroma elements jointly in single tree coded slices) and signal reuse flags for chroma components. Similarly, in luma blocks, only luma components (e.g., Y component) in the palette predictor (which can contain luma and chroma elements jointly in single tree coded slices) are accessed and reuse flags for luma components are signaled.

Another illustrative example approach for addressing conflicts between palette predictor updates and local dual trees can include forcing the palette predictor to have the same size (e.g., the same number of palette entries) for luma and chroma throughout the single tree coded slice. For example, in some cases, after the palette predictor update, the palette predictor elements (e.g., palette entries) for a component (e.g., luma or chroma) that has more entries (e.g., elements) is clipped to the same number of entries (e.g., elements) as the other component. The elements being discarded can be from the end of the palette predictor, from the beginning of the palette predictor, a pre-defined set in the palette predictor, or any other positions.

Another illustrative example approach for addressing conflicts between palette predictor updates and local dual trees can include, after the palette predictor update, the palette predictor elements for a component (e.g., luma or chroma) that has fewer entries (e.g., elements) is padded to the same number of entries (e.g., elements) in the other component. In some examples, the padded value can be a constant value or a pre-defined set of values. In some examples, the padding can be from/at the end of the palette predictor, the beginning of the palette predictor, one or more pre-defined positions, or any other positions.

Another illustrative example approach for addressing conflicts between palette predictor updates and local dual trees can include allowing the palette predictor to have a different size for luma and chroma components in single tree coded slices, but only reusing a fixed number (e.g., a number smaller than the minimum size among luma and chroma) of predictor entries for blocks where local dual tree is not applied.

Another illustrative example approach for addressing conflicts between palette predictor updates and local dual trees can include maintaining sets of palette predictors in single tree coded slices having local dual tree coded blocks. The first palette predictor from the sets of palette predictors can contain luma and chroma components jointly (e.g., the same number of elements for luma and chroma). A second set of palette predictors can contain two separate palette predictors for luma and chroma components. In one example, the palette coded blocks that are local dual tree coded are only allowed to reuse the palette predictor elements (e.g., palette entries) in the second set of palette predictors (e.g., the two separate palette predictors for luma and chroma components), and the palette coded blocks that are not local dual tree coded are only allowed to reuse palette predictor elements in the first palette predictor from the sets of palette predictors (e.g., containing luma and chroma components jointly). In another example, the palette coded blocks that are local dual tree coded are allowed to reuse palette predictor elements in the first palette predictor from the sets of palette predictors (e.g., containing luma and chroma components jointly) or the second set of palette predictors (e.g., the two separate palette predictors for luma and chroma components), depending on which palette predictor was more recently updated. Then, after the palette coding, only the second set of palette predictors (e.g., the two separate palette predictors for luma and chroma components) is updated with the newly-generated palette table. The palette coded blocks which are not local dual tree coded are only allowed to reuse the palette predictor element in the first palette predictor from the sets of palette predictors (e.g., containing luma and chroma components jointly).

Figure 9:
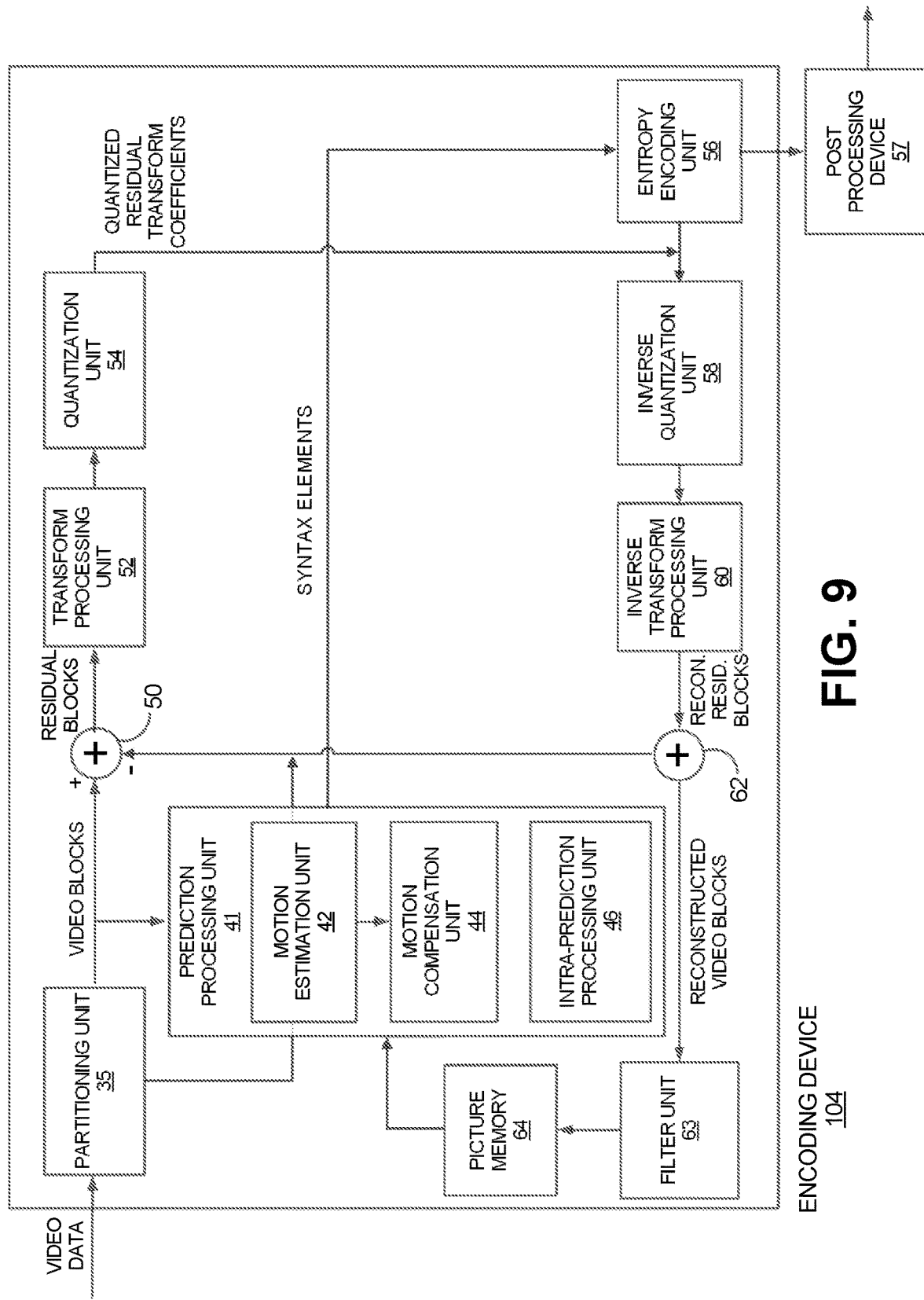
FIG. 9 is a block diagram illustrating an example video encoding device, in accordance with some examples.
Figure 10:
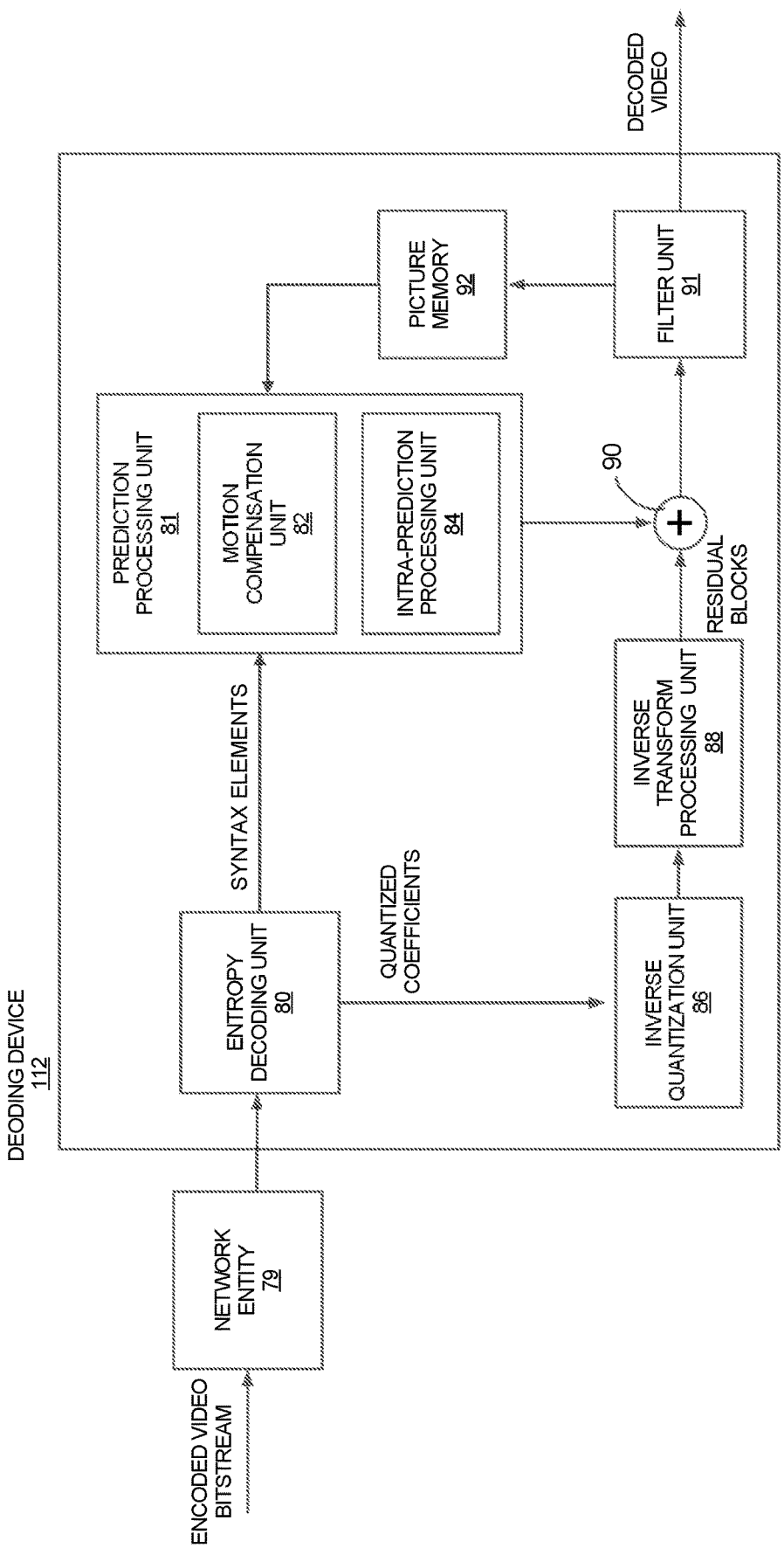
FIG. 10 is a block diagram illustrating an example video decoding device, in accordance with some examples.

The present technologies will be described in the following disclosure as follows. The discussion begins with a description of example systems and technologies for palette coding and updating palette predictors, as illustrated in FIGS. 1 through 7. A description of an example method for managing palette predictor updates, as illustrated in FIG. 8, will then follow. The discussion concludes with a description of example encoding and decoding devices suitable for performing palette coding functionalities, as illustrated in FIGS. 9 and 10. The disclosure now turns to FIG. 1

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device (e.g., 104) and the receiving device (e.g., 112) may include one or more wireless transceivers for wireless communications.

The coding techniques described herein are applicable to video coding in various video and/or multimedia applications, including streaming video transmissions (e.g., over the Internet), television broadcasts or transmissions, remote desktop, wireless display, virtual desktop, screen content (e.g., computer-generated content) rendering, encoding of digital video for storage on a data storage medium, decoding of digital video stored on a data storage medium, or other applications. As used herein, the term coding can refer to encoding and/or decoding. In some examples, system 100 can support one-way or two-way video transmission for applications such as video conferencing, video streaming, video playback, video broadcasting, gaming, screen content rendering, remote desktop, wireless display, video telephony, etc.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (WET) to explore new coding tools for the next generation of video coding standard, named Versatile Video Coding (VVC). The reference software is called VVC Test Model (VTM) (or JEM (joint exploration model)). An objective of VVC is to provide improvements in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other example video coding standards for which some or all of the techniques described herein can be applied.

The techniques described herein can be applied to any existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

In some examples, a video source 102 may provide the video data to the encoding device 104. The video source 102 may be part of the source device (e.g., 104), or may be part of a device other than the source device. The video source 102 may include a video capture device (e.g., a video camera, a camera phone, a video phone, or the like), a video archive containing stored video, a video server or provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRas1OutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

Slices can be partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU can contain luma and/or chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU can correspond to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more tree structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some cases following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some cases, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 9. An example of specific details of the decoding device 112 is described below with reference to FIG. 10.

The example system shown in FIG. 1 is one illustrative example system that can be used to implement the techniques disclosed herein. Techniques for processing video data using the approaches described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

As previously explained, in some examples, a video coder (e.g., a video encoder and/or decoder) can implement a color-based prediction technique called palette coding to increase compression efficiency and/or reduce the amount of color information used and/or transmitted for decoding. Palette coding can exploit the redundancy and/or correlation between palettes of neighboring blocks, similar pixel values, and/or local repetitive pixel patterns in a picture or frame. Palette coding may be especially useful for coding areas of video data having a relatively small number of colors. Rather than coding actual pixel values or their residuals for a given block, the video coder may code index values for one or more of the pixels. The index values can map the pixels to entries in a palette. The palette can include a list or table of colors representing the colors of the pixels. Each color in the palette can be a representative color of a particular area, such as a given block. A palette can be generated for each palette coded area, and entries in the palette can be coded using a palette predictor.

A palette may be explicitly encoded and sent to the decoder, predicted from a palette predictor and/or previous palette entries, or a combination thereof. In some cases, for each entry in a palette predictor, a reuse flag can be signaled to indicate whether that entry should be used in a current palette. Any reused entries from the palette predictor can be added to the current palette. In some cases, the number and color values of entries in the palette that are not in the palette predictor can also be signaled and added to the current palette. After decoding a palette coded area, the palette predictor can be updated for the next palette coded area. The palette predictor can be updated based on entries in the current palette and the previous palette predictor.

Figure 2:
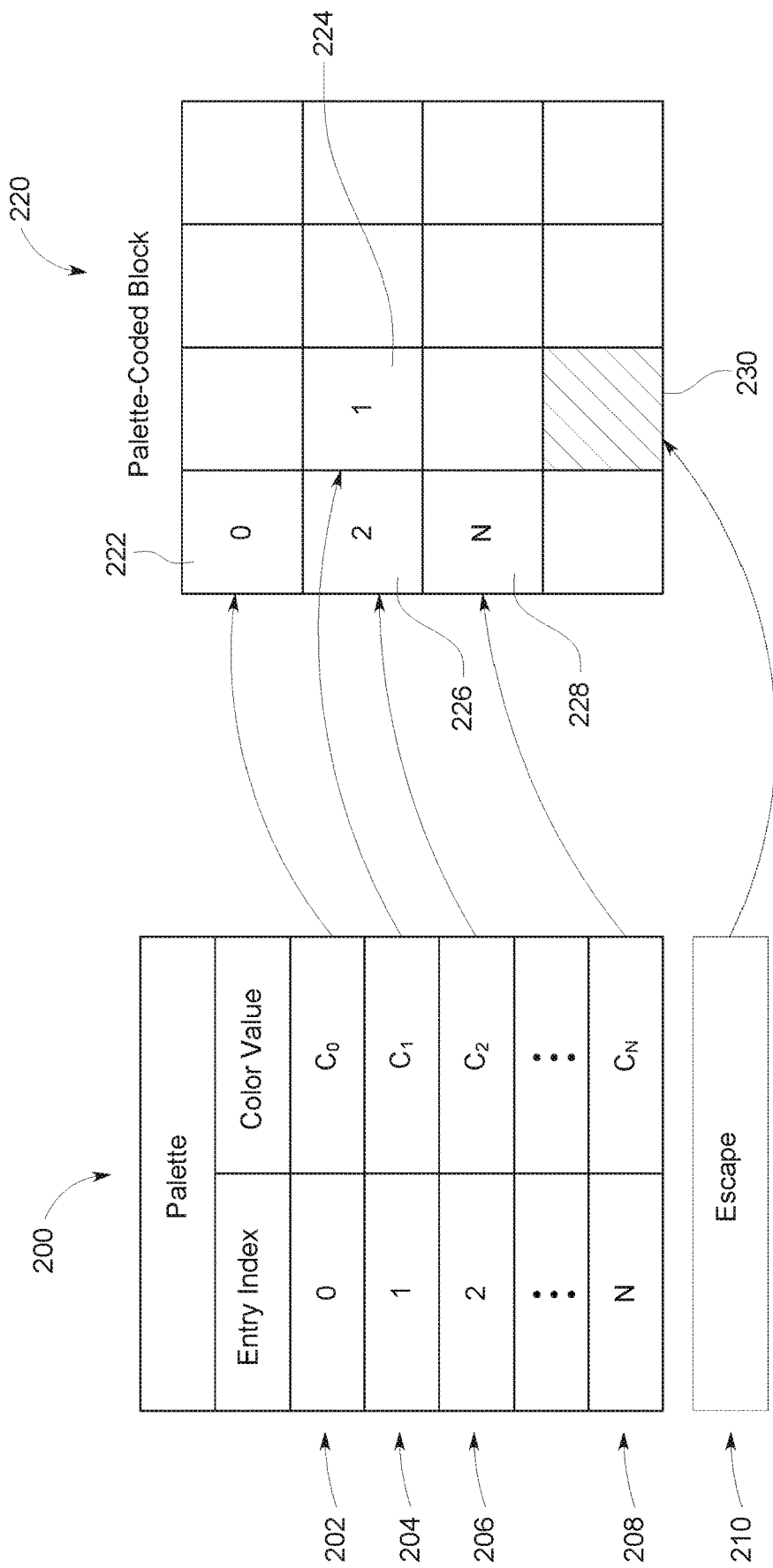
FIG. 2 is a block diagram illustrating an example block coded in palette mode, in accordance with some examples.

FIG. 2 is a block diagram illustrating an example block 220 coded in palette mode (e.g., using palette coding). In this example, the palette-coded block 220 is coded using palette 200. The palette 200 can include palette entries 202-208 having specific index values (e.g., 0, 1, 2, N). The palette entries 202-208 can relate the index values to specific color values (e.g., $C_0$, $C_1$, $C_2$, $C_N$).

Each color value can be a representative color for a particular area and/or sample of the block 220. Thus, instead of coding the actual pixel values of the block 220, the index values in the palette entries 202-208 can be used to code the pixels of the block 220. For example, for any positions (e.g., pixels, samples, blocks, etc.) in the block 220 having sample values similar and/or close to a color value in the palette 200, an index value of a palette entry associated with that color value can be encoded for those positions in the block 220.

The palette entry can relate the index value to that color value in the palette 200. Accordingly, the index value can map the color value in the palette 200 to the positions in the block 220.

For example, the block 220 can be coded with index value 0 for position 222 in the block 220, index value 1 for position 224, index value 2 for position 226, and index value N for position 228. In the palette 200, palette entry 202 relates index value 0 to color value $C_0$, palette entry 204 relates index value 1 to color value $C_1$, palette entry 206 relates index value 2 to color value $C_2$, and palette entry 208 relates index value N to color value $C_N$. Accordingly, in this example, index values 0, 1, 2, and N map and/or indicate color values $C_0$, $C_1$, $C_2$, and $C_N$ for positions 222, 224, 226, and 228, respectively. In some cases, the index values 0, 1, 2, and N can be signaled with/for the block 220, and a decoding device can use the index values 0, 1, 2, and N and the palette 200 to identify the color values $C_0$, $C_1$, $C_2$, and $C_N$ for positions 222, 224, 226, and 228 in the block 220.

In some cases, an escape symbol 210 can be signaled to specify a color value for a sample and/or pixel (e.g., position 230) that is outside of, and/or not included in, the palette 200. In some examples, for positions in the block 220 that are coded using the escape symbol 210, such as position 230, the associated component value(s) can be signaled using one or more quantized component values.

While FIG. 2 depicts a single palette, in some implementations, a video coder can code separate palettes for different color components. For example, in some cases, a video coder can code a palette for a luma component and a separate palette for a chroma component.

Figure 3:
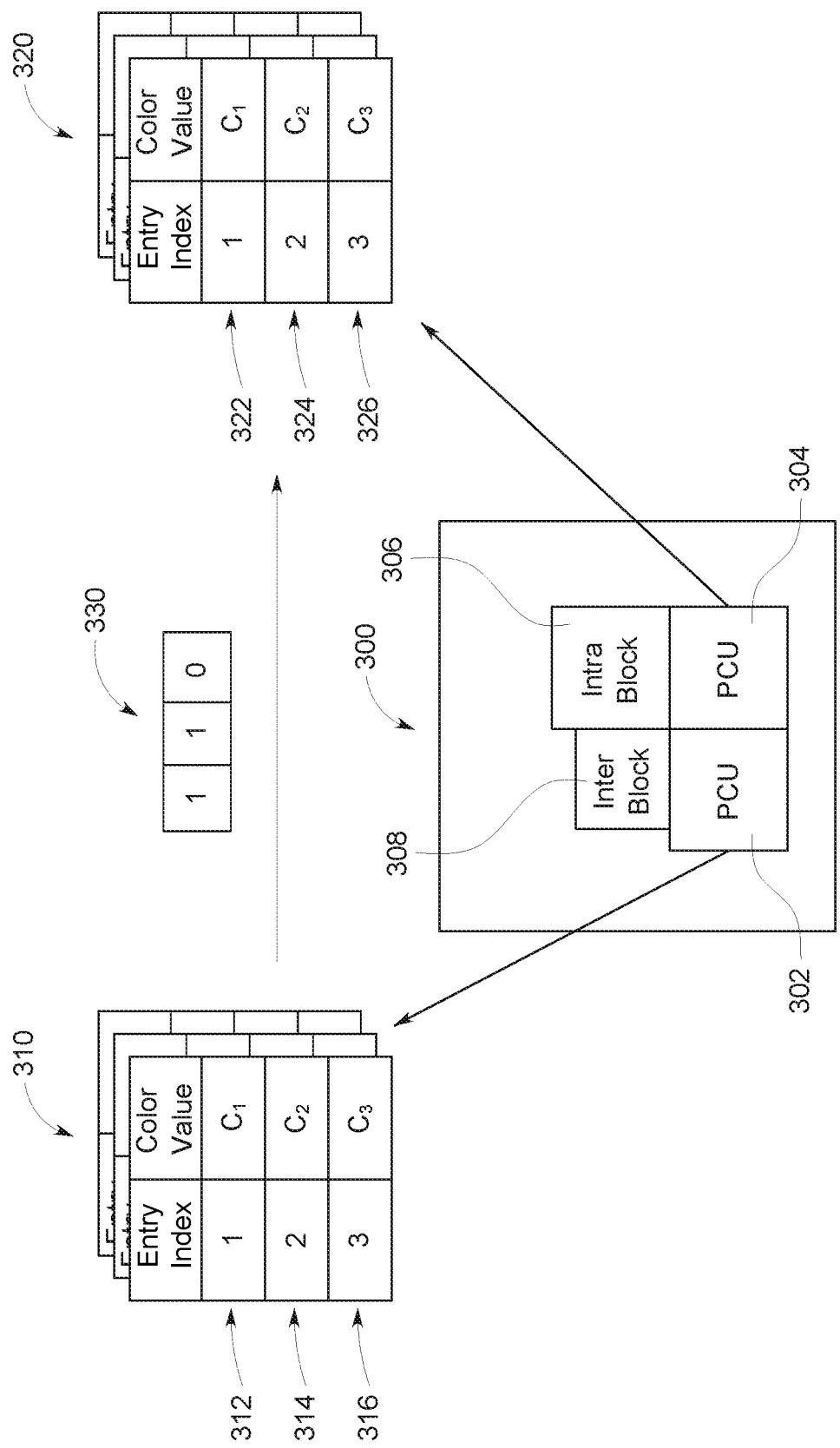
FIG. 3 is a block diagram illustrating an example picture coded in palette mode, in accordance with some examples.

FIG. 3 is a block diagram illustrating an example picture 300 coded in palette mode. The picture 300 includes a palette-coded unit (PCU) 302 associated with one or more palettes 310, and a PCU 304 associated with one or more palettes 320. Picture 300 also includes intra block 306 coded with an intra-prediction coding mode and inter block 308 coded with an inter-prediction coding mode.

In this example, the palettes 310 and 320 are shown as including multiple palettes. In some cases, a video coder can code palettes separately for each color component of a CU. In some cases, video encoder 104 can encode a palette for a luma component of a CU and one or more other palettes for a Cr chroma component and a Cb chroma component of the CU. Entries of the luma palette can represent luma values of pixels of the CU, entries of a Cr chroma palette can represent Cr chroma values of pixels of the CU, and entries of a Cb chroma palette can represent Cb chroma values of pixels of the CU.

In other examples, video encoder 104 can encode a single palette for all color components of a CU. For example, video encoder 104 can encode a palette entry associated with a luma value, a Cr chroma value, and a Cb chroma value. In this case, the palette includes values for each of the components of the pixels. Accordingly, the representation of palettes 310 as a set of palettes having multiple individual palettes is merely one example and not intended to be limiting.

In the example of FIG. 3, the palette 310 includes three palette entries 312, 314, 316 having index values 1, 2, and 3, respectively. Palette entries 312, 314, 316 relate the index values 1 2, and 3 to pixel values (e.g., color values) including color values $C_1$, $C_2$, and $C_3$, respectively. Rather than coding the actual pixel values of PCU 302, a video coder can use palette-based coding to code the pixels of the block using the index values 1, 2, 3. Here, for each pixel position of PCU 302, the video encoder may encode an index value for the pixel, where the index value corresponds to a palette entry (e.g., 312, 314, 316) that indicates a color value for the pixel in the palette 310. A video decoder can obtain the index values from a bitstream and reconstruct the color values using the index values and the palette 310. In some cases, the video encoder can transmit the palette 310 in an encoded video data bitstream for use by the video decoder in palette-based decoding.

In some examples, one or more additional palettes 320 can be calculated based on the one or more palettes 310 used for the PCU 302. For example, the previously-coded CU (e.g., PCU 302) and the palette 310 used for the previously-coded CU, can be used to determine a palette 320 for coding PCU 304. The palette 320 can include one or more palettes. In the example of FIG. 3, the palette 320 includes three palette entries 322, 324, 326 having index values 1, 2, and 3, respectively. Palette entries 322, 324, 326 relate the index values 1, 2, and 3 to pixel values including color values $C_1$, $C_2$, and $C_3$, respectively. In this example, a video encoder can code one or more syntax elements indicating which entries of the palette 310 are included in the palette 320. In this example, the one or more syntax elements are illustrated as a vector 330. Vector 330 has a number of associated bits or flags with each bit or flag indicating whether the palette predictor associated with that bit or flag is used to predict an entry of the current palette. For example, vector 330 indicates that the first two entries of the palette 310 (e.g., entries 312 and 314) are included in the palette 320 (e.g., based on the value of "1" in the first two bins of vector 330), while the third entry of the palette 310 is not included in the palette 320 (e.g., as indicated by the value of "0" in the third bin of vector 330).

Figure 4:
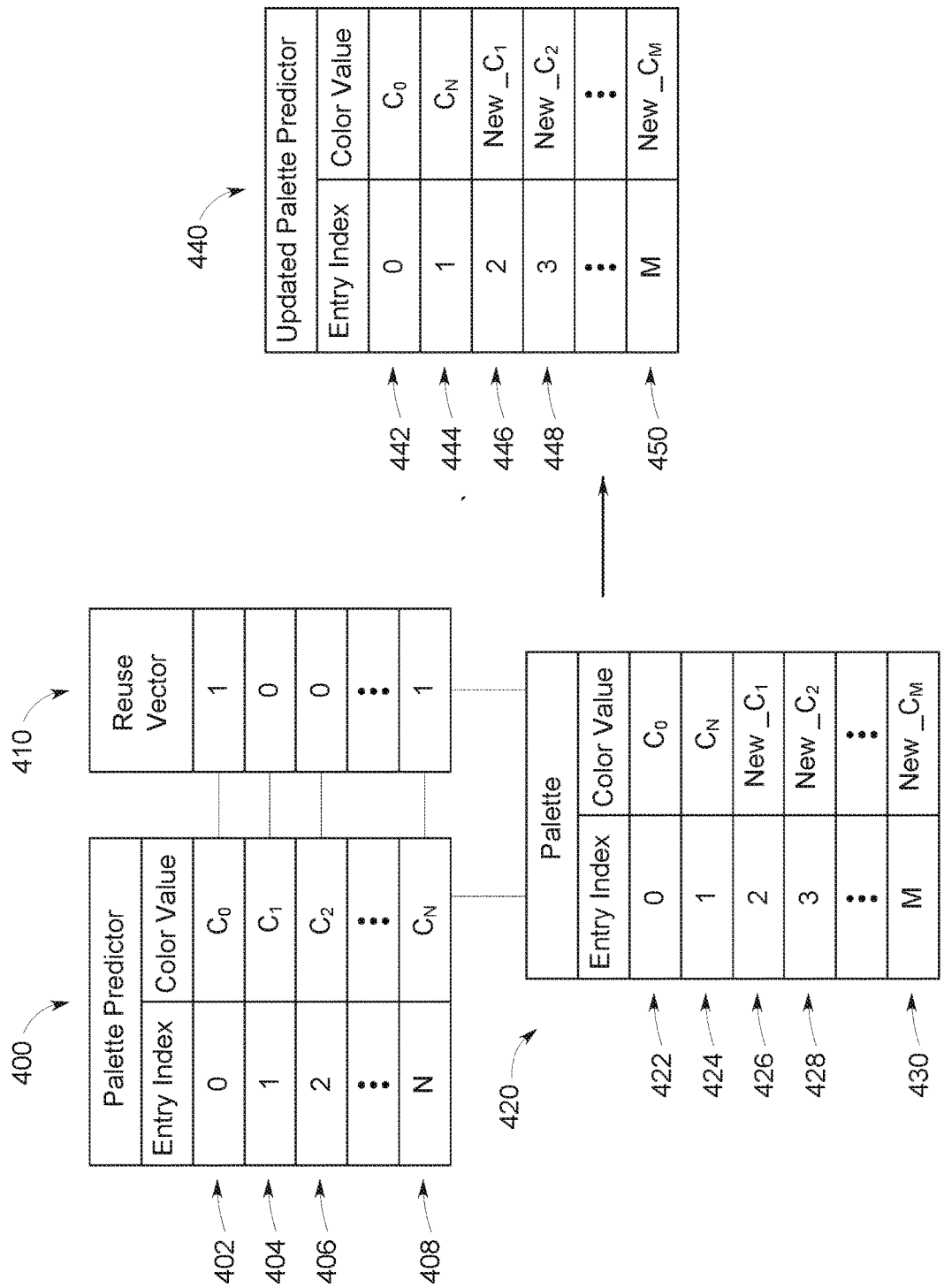
FIG. 4 is a block diagram illustrating an example palette predictor update, in accordance with some examples.

FIG. 4 is a block diagram illustrating an example palette predictor update prior to a palette predictor adjustment as further described with respect to FIGS. 5 through 8. In some cases, a palette predictor can be updated each time a block is palette coded. In some cases, the updated palette predictor can carry color information from one or more previously-coded blocks so the decoder can obtain such color information from the palette predictor without the encoder having to signal or transmit the color information to the decoder. In some cases, the updated palette predictor can be generated and/or updated based on color information in a current palette. The updated palette predictor can be used to palette code new blocks based on color information in the updated palette predictor.

For example, a palette predictor can be maintained with index entries and associated color information. At least some of the color information for a current block can be determined based on a current palette and/or the current block. In some cases, the current block and the current palette can include new color information that is not included in a previous palette predictor, and can be included in the updated palette predictor as described herein. In some examples, some or all of the entries in the current palette, including reused entries from a previous palette predictor and/or new color information in the current block, can be used to calculate the updated palette predictor. The updated palette predictor can be used to palette code a next block, and updated again based on color information in the next palette and/or the next block. Thus, in some examples, when the palette predictor is updated after the current block is coded and/or before coding the next block, the entries in the updated palette predictor can include new color information from the current block/palette and/or one or more entries from the previous palette predictor that are reused in the current palette.

In the example of FIG. 4, the palette predictor 400 is used to generate at least a portion of the palette 420. The palette predictor 400 represents a previous palette predictor used to palette code a previous block. The palette predictor 400 includes palette entries 402, 404, 406, 408 having index values 0, 1, 2, through N, respectively. Palette entries 402, 404, 406, 408 relate the index values 0, 1, 2, through N to pixel values including color values $C_0$, $C_1$, $C_2$, through $C_N$, respectively. The color values $C_0$, $C_1$, $C_2$, through $C_N$ can represent color information such as, for example, a luma value, a Cr chroma value, and/or a Cb chroma value or, alternatively, a red (R) value, a blue (B) value, and/or a green (G) value.

A reuse vector 410 can be used to indicate which color values in the palette predictor 400 should be reused and/or included in the palette 420. In some examples, the reuse vector 410 can include bits or flags indicating whether associated palette entries in the palette predictor 400 should be reused and/or included in the palette 420. For example, the reuse vector 410 in FIG. 4 includes bits or flags (e.g., the "1" values) indicating that the color values associated with palette entries 402 and 408 (e.g., color values $C_0$ and $C_N$) should be reused and/or included in the palette 420, and bits or flags (e.g., the "0" values) indicating that the color values associated with palette entries 404 and 406 (e.g., color values $C_1$ and $C_2$) should not be reused and/or included in the palette 420. Accordingly, when generating the palette 420, the color values $C_0$ and $C_N$ associated with palette entries 402 and 408 and associated index values (e.g., 0 and N) in the palette predictor 400 can be included in the palette 420.

As previously noted, new color information derived from, and/or signaled (e.g., by the video encoder) for the current palette-coded block can also be included in the palette 420. The new color information can include color information that was not included in the palette predictor 400 and/or that was not captured from a previous palette-coded block(s), but was instead signaled for, and/or derived from, the current palette-coded block. In this example, the palette 420 includes palette entries 422-430 having color information derived from the reused palette entries in the palette predictor 400 (e.g., palette entries 402 and 408 corresponding to color values $C_0$ and $C_N$) and the new color information associated with the current palette-coded block. Thus, the palette entries 422-430 in the palette 420 can include color values $C_0$ and $C_N$ from the palette predictor 400 and new color values New_$C_1$, New_$C_2$ and New_$C_M$ corresponding to the new color information associated with the current palette-coded block.

The updated palette predictor 440 can be updated and/or calculated based on the palette 422. The updated palette predictor 440 can include palette entries 442-450 with color information from the palette 420. In the example updated palette predictor 440 in FIG. 4, palette entries derived from new color information in the palette 420 are included at the bottom of the updated palette predictor 440. However, such ordering of palette entries is merely an illustrative example provided for explanation purposes. One of skill in the art will understand that the ordering of palette entries in the updated palette predictor 440 can vary in other examples. For example, in some cases, palette entries derived from new color information in the palette 420 can instead be included at the top of the updated palette predictor 440. In other examples, palette entries derived from new color information in the palette 420 can be included in the updated palette predictor 440 based on a different ordering such as, for example, a random ordering, sequentially, an ordering based on a proximity of the current block to the blocks from which the color values were derived, a correlation of color values to samples in the block, a frequency of use of the color values, and/or based on any other factor.

For illustrative and explanation purposes, the palette predictor update in FIG. 4 only shows one updated palette predictor and each palette entry only shows one color value. However, in other examples, the palette predictor update can include updating multiple palette predictors and/or palette entries that include multiple, respective color values. For example, in a local dual tree scenario where luma and chroma blocks are partitioned separately/independently, the palette predictor update can include updating a palette predictor associated with the luma block and a palette predictor associated with the chroma block. In another example, the palette predictor update can include updating palette predictor entries having both luma and chroma values. Moreover, in some examples, one or more palette predictors can be updated based on one or more previous palette predictors and/or color values from multiple blocks (current block, previously-coded blocks, etc.).

In some cases, palette predictor size conflicts and/or variations can arise when one or more blocks are coded using a single tree and other blocks are coded using a local dual tree. For example, a block coded using a single tree structure can have a same block partition size for luma and chroma. Thus, the palette predictor(s) used to palette code luma and chroma components in single tree coded blocks can maintain a same size and/or number of palette entries for luma and chroma. In some cases, a single palette predictor with a same number of palette entries for luma and chroma can be maintained for single tree coded blocks. In other cases, a set of palette predictors having a same size (e.g., a same number of palette entries) can be maintained separately or jointly for luma and chroma. In any case, when palette coding a next block, the number of palette entries for luma and chroma can be the same and no palette predictor size conflicts (or related problems) may arise.

On the other hand, a block coded using a local dual tree structure can have a different block partition sizes for luma and chroma. As a result, the palette predictor(s) used to palette code luma and chroma components in dual local tree coded blocks can have different sizes. In some cases where a joint palette predictor is implemented for luma and chroma, the joint palette predictor can have a different number of palette entries for luma and chroma. In other cases where a set of palette predictors are implemented for luma and chroma, the palette predictors for luma and chroma can have different sizes (e.g., a different number of palette entries). In either case, when palette coding a next block, the number of palette entries for luma and chroma may differ, resulting in palette predictor size conflicts (and related problems).

The palette predictor size conflicts can create problems when palette coding blocks or can cause the decoder to crash when palette coding. For example, a palette predictor update performed after coding a local dual tree coded block can result in different palette predictor sizes (and/or a different number of palette entries) for luma and chroma. The different palette predictor sizes can then cause various errors and/or problems when palette coding other blocks. To illustrate, if a palette predictor update results in n number of palette entries for chroma and n+m number of palette entries for luma (or vice versa), when the decoder tries to access color information to palette code a next block, such as a single tree block, the decoder may expect and/or try to access n+m number of respective palette entries for luma and chroma. Accordingly, after accessing the color information in the n number of palette entries for chroma, the decoder may attempt and fail to access color information for m number of additional palette entries for chroma, as the palette predictor does not have the additional m number of additional palette entries for chroma. The missing chroma information and/or the additional luma information can then create errors and/or inaccuracies when palette coding the next block.

Alternatively, after accessing the color information in the n number of palette entries for chroma, the decoder may attempt to access color information for m number of additional palette entries for chroma and instead retrieve the wrong color information, such as color information for luma from one or more of the palette entries for luma. The decoder may consequently use wrong color information when palette coding the chroma component in the next block. This can result in errors and/or inaccuracies when palette coding the next block. To avoid palette predictor size conflicts and associated errors and/or problems, the palette predictor update process can be adjusted to ensure the same palette predictor size is maintained when the palette predictor is updated.

Figure 5:
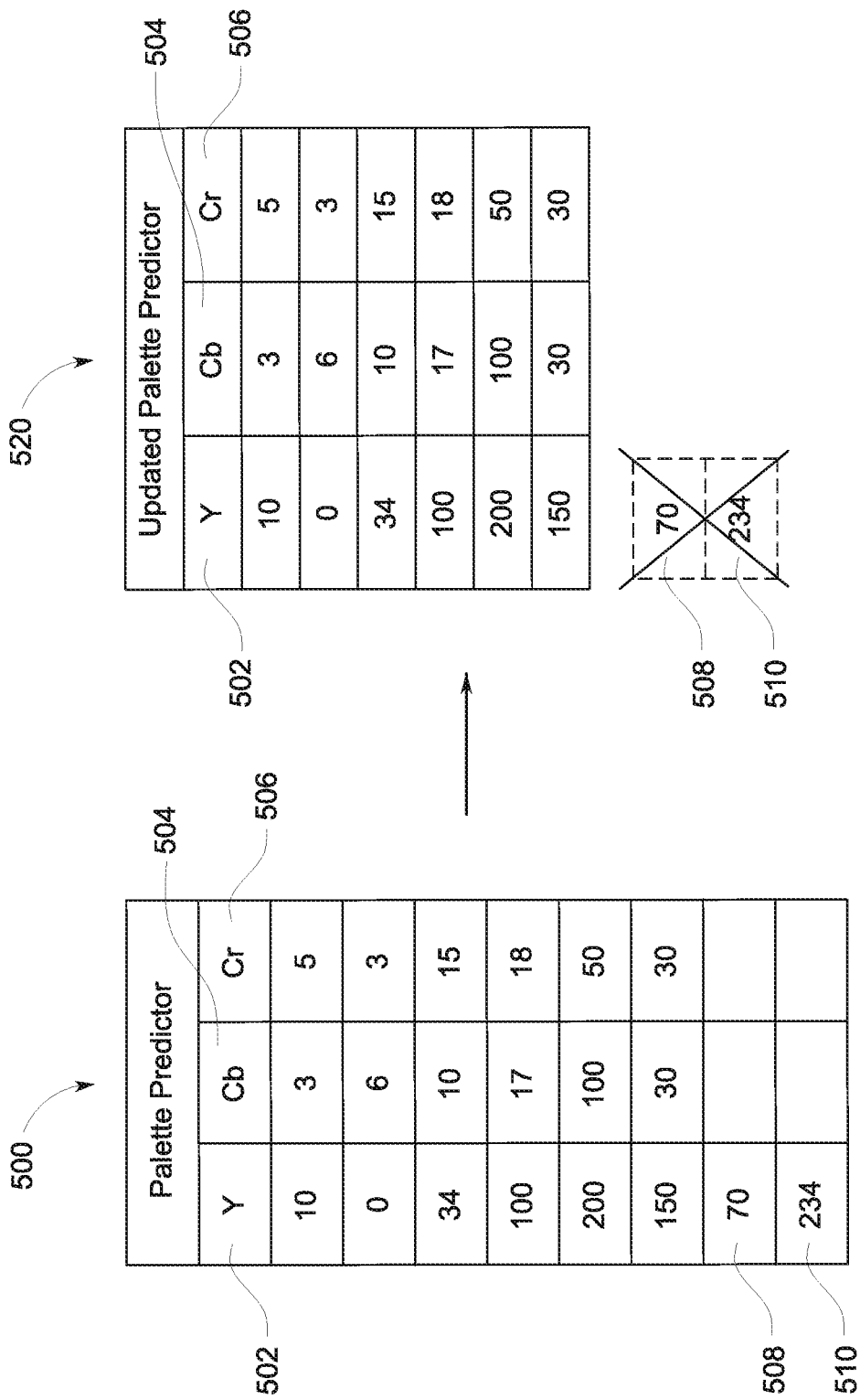
FIGS. 5 through 7 are diagrams illustrating example techniques for maintaining a same palette predictor size for different image components after a palette predictor update, in accordance with some examples.

FIG. 5 is a diagram illustrating an example technique for maintaining a same palette predictor size for luma and chroma after a palette predictor update. In this example, an updated palette predictor can be clipped to ensure a same palette predictor size (and/or number of palette entries) is maintained for luma and chroma. In some cases, the clipping can be used to force the palette predictor to have a same size for luma and chroma throughout a single tree coded slice. For example, if a local dual tree coded block results in a different number of luma and chroma palette entries, the updated palette predictor can be clipped so it has the same number of luma and chroma palette entries and can be used when palette coding a next block without palette predictor size conflicts.

As shown in FIG. 5, the palette predictor 500 can be a joint palette predictor that includes palette entries 502 for luma (Y), palette entries 504 for Cb chroma, and palette entries 506 for Cr chroma. However, the palette predictor 500 includes more palette entries for luma than Cb chroma and Cr chroma. In this example, the palette predictor 500 includes additional palette entries 508 and 510 for luma. In some cases, the different palette predictor sizes for luma and chroma (Cb and Cr) can be a result of a local dual tree structure used to code the luma and chroma blocks.

To fix the size conflict between the luma and chroma palette entries, the updated palette predictor 520 has been clipped to remove the additional palette entries 508 and 510 for luma. After clipping the additional palette entries 508 and 510 for luma, the updated palette predictor 520 includes the same number of palette entries 502, 504, and 506 for luma, Cb chroma, and Cr chroma.

In this example, the luma component is shown as having more palette predictor entries than the Cb and Cr chroma components. Accordingly, the entries clipped from the updated palette predictor 520 are luma component entries. However, in other cases, the Cb and Cr chroma components can have more palette predictor entries than the luma component. In such cases, the entries clipped from the updated palette predictor 520 can include Cb and Cr chroma component entries.

In FIG. 5, the updated palette predictor 520 has been clipped from the bottom/end of the palette predictor to remove the additional entries causing the size conflict between the luma and chroma palette predictors. However, in some examples, when clipping the updated palette predictor 520, the palette entries removed from the palette predictor can include a pre-defined set of entries associated with the color component with the most palette entries in the palette predictor. In other examples, when clipping the updated palette predictor 520, the palette entries removed from the palette predictor can be one or more entries from the top/beginning of the palette predictor and/or any other region of the palette predictor.

Figure 6:
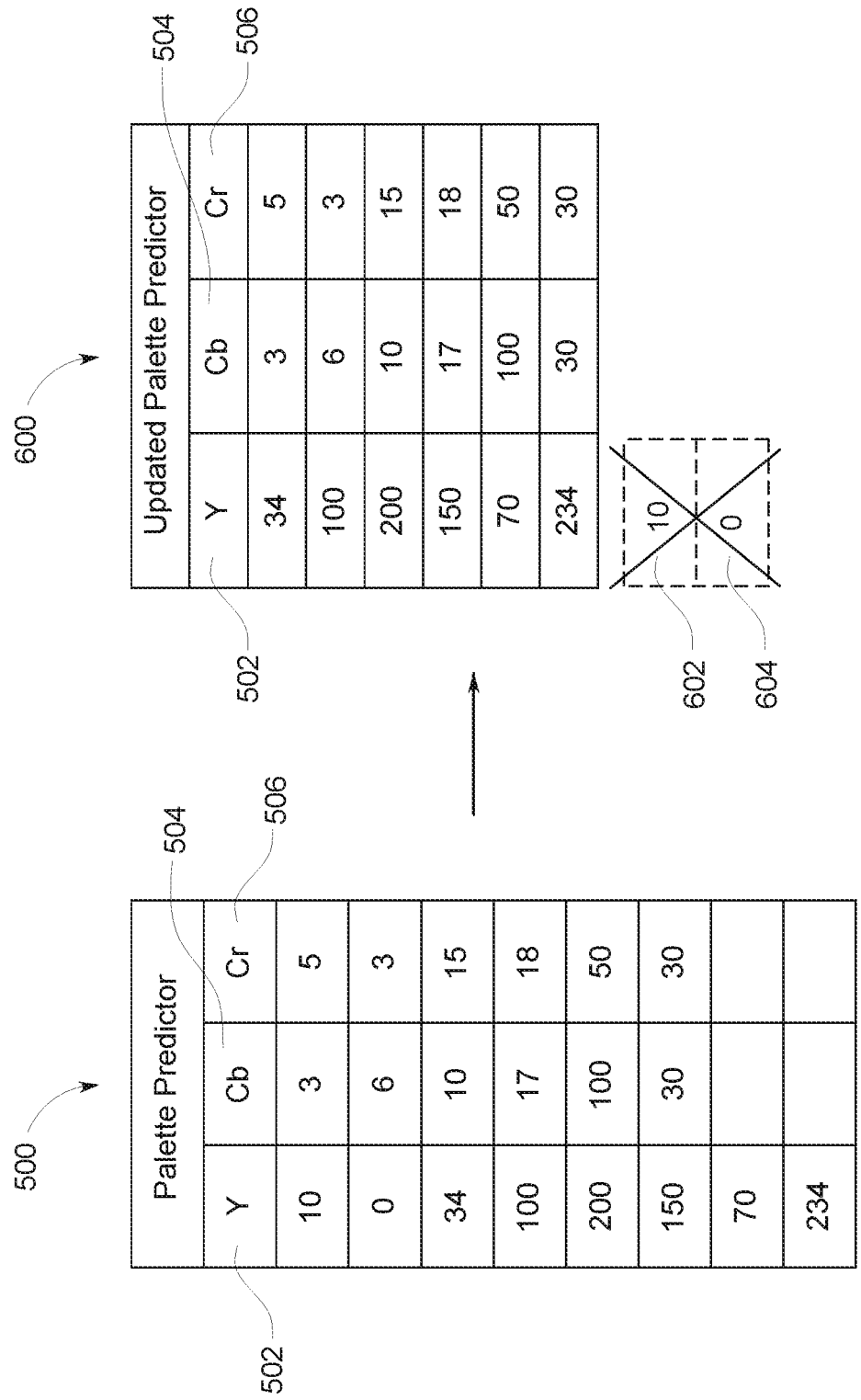

For example, with reference to FIG. 6, to fix the size conflict between the luma and chroma palette entries 502, 504, and 504 in the palette predictor 500, the updated palette predictor 600 in FIG. 6 has been clipped from the top/beginning. That is, instead of removing the additional palette entries for luma (e.g., entries 508 and 510 in FIG. 5) located at the bottom/end of the palette predictor (e.g., the last luma palette entries), the luma palette entries 602 and 604 located at the top/beginning of the palette predictor (e.g., the first luma palette entries) have been removed from the updated palette predictor 600.

In some cases, instead of, or in addition to, clipping the updated palette predictor to remove extra palette entries causing a size conflict, the updated palette predictor can be padded with palette entries for a component having fewer entries in the palette predictor. For example, turning to FIG. 7, instead of clipping the palette predictor to remove palette entries for the luma component, which has more entries than the Cb chroma and Cr chroma components, the updated palette predictor 700 has been padded with entries 702-708 for the Cb chroma and Cr chroma components which, before the padding, had less entries than the luma component.

The entries 702-708 can be added to a top/beginning of the updated palette predictor 700, the bottom/end of the updated palette predictor 700, the middle of the updated palette predictor 700, and/or any other region of the updated palette predictor 700. In some cases, the entries 702-708 can be added to the updated palette predictor 700 as new luma entries are added to the palette predictor (or as new chroma entries are added if the palette predictor is instead being padded with luma entries).

In some examples, the values added to the updated palette predictor 700 when the updated palette predictor 700 is padded (e.g., the values for entries 702-708) can be predetermined values. For example, in some cases, the values added to the updated palette predictor 700 when padding the updated palette predictor 700 can be the largest value allowed/supported by the color bit-depth of the image (e.g., 255 for 8 bit, 1023 for 10 bit, 4095 for 12 bit, etc.).

In some cases, if the current tree type is dual tree and the current tree corresponds to the chroma components, the luma values for luma entries used to pad the updated palette predictor 700 with additional luma entries can be calculated as follows:

$$\text{LumaPaletteEntries}=1<<(\text{BitDepth}-1) \quad \text{Equation (1)}$$

Thus, Equation (1) can define a luma value to insert into the updated palette predictor 700 when the current tree type is dual tree and the current tree corresponds to the chroma components.

If the current tree type is dual tree and the current tree corresponds to the luma component, the chroma values for chroma entries used to pad the updated palette predictor 700 with additional chroma entries can be calculated as follows:

$$\text{CbChromaPaletteEntries}=1<<(\text{BitDepth}-1) \text{ for Cb chroma; and}$$

$$\text{CrChromaPaletteEntries}=1<<(\text{BitDepth}-1) \text{ for Cr chroma.} \quad \text{Equation (2)}$$

Thus, Equation (2) can define a Cb chroma and Cr chroma value to insert into the updated palette predictor 700 when the current tree type is dual tree and the current tree corresponds to the luma component.

In Equations (1) and (2), the term "<<" is a left shift arithmetic operator, which can be used to calculate the palette entry values based on a bit depth value. For example, using Equation (2) to calculate values for entries 702-708 in the updated palette predictor 700, given a bit depth value of 8, the values for entries 702-708 would equal 1<<(8−1), which equals 1 left shift 7. Left arithmetic shift by n is equivalent to multiplying by $2^n$. Therefore, 1 left shift 7 is equal to $2^7$. Thus, when the bit depth value is 8, the values for entries 702-708 can equal $2^7$.

As described above, the example techniques shown in FIGS. 5-7 for maintaining a same palette predictor size for luma and chroma after a palette predictor update involve clipping and/or padding the palette predictor. However, some examples may implement other strategies for maintaining a same palette predictor size for luma and chroma after a palette predictor update.

In one illustrative example, a technique for maintaining a same palette predictor size for luma and chroma can involve bypassing palette predictor updates for blocks using local dual tree. For example, for blocks using local dual tree in a single tree coded slice, the palette predictor update after palette coding can be skipped. Here, the palette predictor for the next palette coded block will be the same as the palette predictor used for the current palette coded block. By doing skipping the palette predictor update for blocks using local dual tree, the number of luma and chroma palette entries in the palette predictor will remain the same throughout the single tree coded slice.

In some examples, for palette derivation, chroma blocks can access only chroma components (e.g., Cb and Cr chroma components) in the palette predictor, which can contain luma and chroma palette entries jointly in single tree coded slices, and reuse bits or flags can be signalled for the chroma components. Similarly, luma blocks can access only luma components in the palette predictor and reuse bits or flags for luma components can be signaled.

In another illustrative example, the palette predictor can be allowed to have different sizes for luma and chroma components in single tree coded slices. However, for blocks where local dual tree is not applied, only a fixed number of palette predictor entries, such as a number smaller than the smaller size between luma and chroma, can be reused.

In another illustrative example, multiple palette predictors can be maintained for single tree coded slices having local dual tree coded blocks. The palette predictor(s) can contain luma and chroma components jointly (e.g., can contain the same number of palette entries for luma and chroma). A different set of palette predictors can include two separate palette predictors for luma and chroma components. In some cases, the palette coded blocks that are local dual tree coded may only be allowed to reuse palette predictor entries in the different set of palette predictors that includes two separate palette predictors for luma and chroma components. On the other hand, the palette coded blocks that are not local dual tree coded may only be allowed to reuse palette predictor entries in the palette predictor(s) containing luma and chroma components jointly.

In other cases, the palette coded blocks that are local dual tree coded can be allowed to reuse palette predictor entries in the palette predictor(s) containing luma and chroma components jointly or the different set of palette predictors that includes two separate palette predictors for luma and chroma components, depending on which palette predictor was more recently updated. After the palette coding, only the different set of palette predictors that includes two separate palette predictors for luma and chroma components may be updated with the newly-generated palette. The palette coded blocks that are not local dual tree coded may only be allowed to reuse palette predictor entries in the palette predictor(s) containing luma and chroma components jointly.

FIG. 8 is a flowchart illustrating an example process 800 for managing palette predictor updates. In some examples, the process 800 can be used to maintain a same palette predictor size for image components (e.g., luma and chroma) when using local dual tree, as previously described.

At block 802, the process 800 can include determining a current palette coding block of a single tree coded slice of a picture is encoded according to a local dual tree. The current palette coding block can include, for example and without limitation, a coding unit (CU), a prediction unit (PU), a transform unit (TU), a coding block (CB), or any other block of the picture. In some examples, the picture can be part of encoded video data (e.g., an encoded video bitstream), such as when the process 800 is performed by a decoding device (e.g., 112). In other examples, the picture can be part of un-encoded video data, such as when the process 800 is performed by an encoding device (e.g., 104).

In some cases, the picture can part of a plurality of pictures, and can be divided into a plurality of blocks, as described herein. The picture can include video data such as, for example, pixel values, signaled information, etc. In some examples, the video data can include information signaled for one or more palettes and/or palette predictors associated with one or more blocks of the picture, such as color information, palette index entries, reuse flags/bits, etc. In other examples, the video data can include motion information for the picture and/or one or more blocks of the picture, which can be used to perform motion compensation.

At block 804, the process 800 can include determining, after an update of a palette predictor(s) (e.g., 500, 600, 700) associated with the current palette coding block, a first number of palette predictor entries for a first image component of the current palette coding block and a second number of palette predictor entries for a second image component of the current palette coding block. For example, the process 800 can include determining a respective number of luma and chroma palette predictor entries (e.g., 502, 504, and 504) in the updated palette predictor, such as n number of Cb and Cr chroma entries and n+m number of luma entries.

In some cases, the first image component can include color components from a first color channel (e.g., luma, chroma) and the second image component can include one or more color components from a second color channel that is different than the first color channel. In some examples, the first image component can include a luma component and the second image component can include one or more chroma components, such as Cb chroma and Cr chroma. In other examples, the first image component can include one or more chroma components, such as Cb chroma and Cr chroma, and the second image component can include a luma component. Thus, determining the first and second numbers of palette predictor entries can include determining a number of luma entries and a number of chroma entries (e.g., Cb chroma entries and/or Cr chroma entries).

In some cases, the palette predictor and/or the updated palette predictor can include a joint palette predictor having the first number of palette predictor entries for the first image component and the second number of palette predictor entries for the second image component. In other examples, the palette predictor and/or the updated palette predictor can include a first palette predictor associated with the first image component and a second palette predictor associated with the second image component. For example, the palette predictor and/or the updated palette predictor can include different palette predictors corresponding to the first and second image components, respectively.

Figure 7:
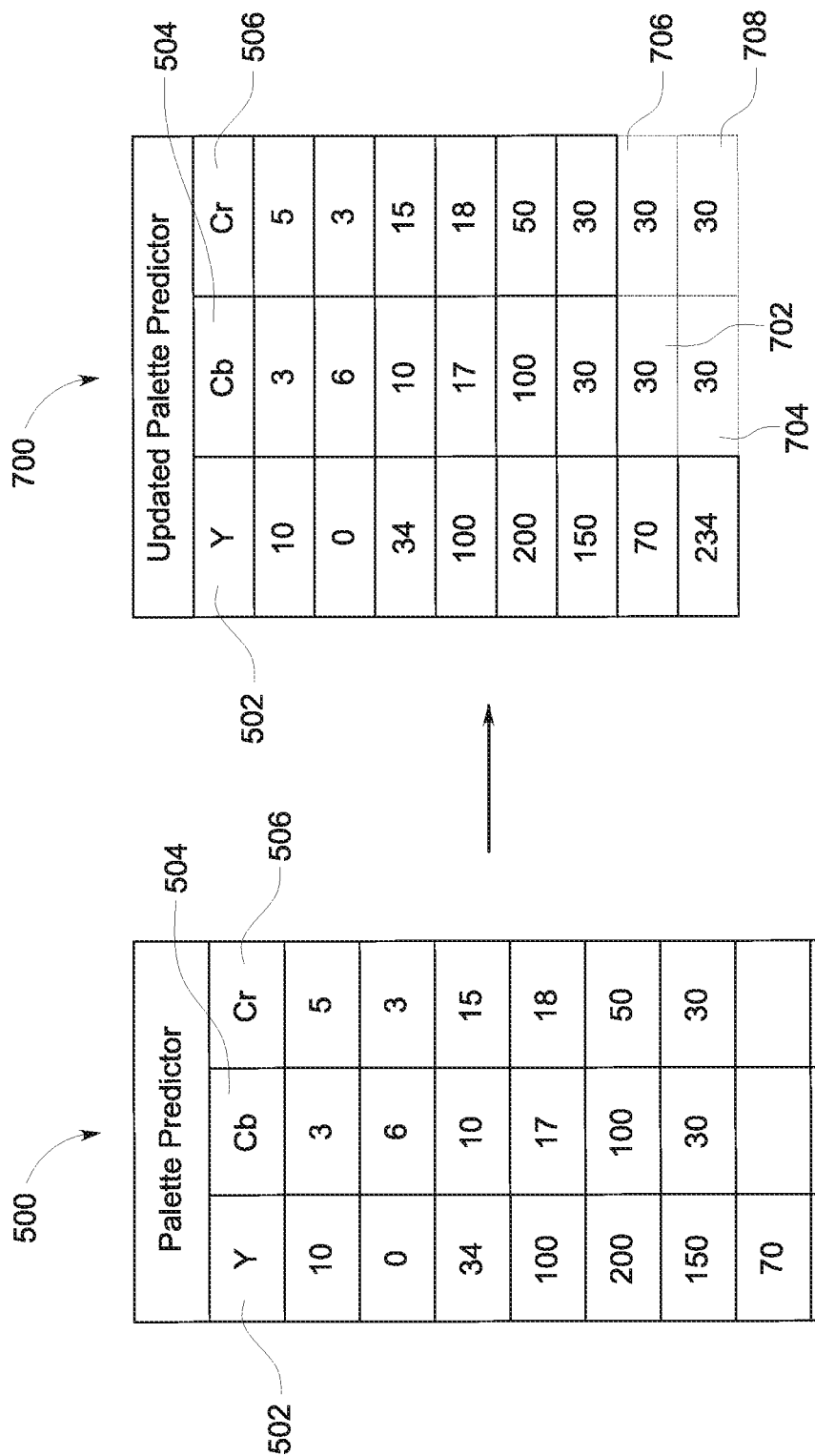

At block 806, the process 800 can include determining the first number of palette predictor entries is greater than the second number of palette predictor entries. For example, the process 800 can determine that the updated palette predictor has more palette predictor entries for one image component than one or more other image components (e.g., more luma palette entries than Cb and Cr chroma entries, or vice versa), as illustrated in FIGS. 5 through 7. The difference in palette predictor entries for different image components can indicate palette predictor size conflicts as previously described.

At block 808, the process 800 can include modifying the updated palette predictor to include a same number of palette predictor entries for the first image component and the second image component. In some examples, the updated palette predictor can be modified based on, and/or in response to, determining that the first number of palette predictor entries is greater than the second number of palette predictor entries. Moreover, in some examples, modifying the updated palette predictor can include padding and/or clipping the updated palette predictor as illustrated in FIGS. 5 through 7.

In some aspects, modifying the updated palette predictor can include adding, to the updated palette predictor, one or more palette predictor entries for the second image component (e.g., for the image component having less entries). The one or more palette predictor entries can include one or more component values (e.g., 702, 704, 706, 708) calculated for the second image component. In some aspects, the one or more component values can be calculated according to Equation (1) or Equation (2).

In some aspects, the process 800 can include calculating the one or more component values for the second image component by left shifting a first integer by a second integer. In some examples, the second integer can be a result of a bit depth value (e.g., 8 bit, 10 bit, 12 bit, etc.) for a sample from the current palette coding block minus a third integer. In some cases, the first integer and the third integer can each equal 1, and left shifting the first integer by the second integer includes raising 2 to a power of an exponent equivalent to the second integer. For example, if the first integer and the third integer are each equal to 1 and the bit depth value is 8, the second integer (the bit depth value minus the third integer) is 7. Accordingly, in this example, left shifting the first integer by the second integer can equal to 2 raised to the power of 7 or $2^7$. Thus, the one or more component values included in the one or more palette predictor entries added to the updated palette predictor can be the result of $2^7$ (e.g., 128).

In some aspects, the process 800 can include, prior to modifying the updated palette predictor, determining the local dual tree associated with the current palette coding block corresponds to the first image component. For example, the process 800 can include determining that the local dual tree corresponds to a luma component, a Cb chroma component, or a Cr chroma component. This information can be used to determine whether to add luma palette predictor entries or chroma palette predictor entries to the updated palette predictor when padding the updated palette predictor as part of modifying the updated palette predictor. For example, if the local dual tree corresponds to the luma component, the process 800 can modify the updated palette predictor by adding one or more palette predictor entries for the chroma components (e.g., Cb chroma and Cr chroma). On the other hand, if the local dual tree corresponds to the chroma component, the process 800 can modify the updated palette predictor by adding one or more palette predictor entries for the luma component. The one or more palette predictor entries can include component values for the associated component (e.g., luma or Cb and Cr chroma). In some example, the component values can be calculated according to Equation (1) or Equation (2).

In some aspects, modifying the updated palette predictor can include clipping the updated palette predictor to remove one or more palette predictor entries for the first image component. For example, modifying the updated palette predictor can include clipping one or more palette predictor entries corresponding to an image component having more palette predictor entries than one or more other image components in the current palette coding block, as illustrated in FIGS. 5 and 6.

In some aspects, the process 800 can include determining a different palette coding block of the single tree coded slice is encoded according to a local dual tree and, based on the different palette coding block being encoded according to a local dual tree, skipping a palette predictor update for the different palette coding block. By skipping the palette predictor update for the different block coded according to a local dual tree, the process 800 can avoid palette predictor size conflicts (and potential errors and/or problems that can arise when coding a single tree block using palette predictor(s) with a different number of entries for different components), as previously described.

In some aspects, the process 800 can include generating the palette predictor based on a set of values (e.g., color values) in a current palette (e.g., 200, 310, 320, 420) associated with the current palette coding block. In some examples, the process 800 can include determining and/or generating the current palette based on one or more reused values (e.g., color values $C_0$ and $C_N$ from entries 402 and 408 in predictor palette 400) from a previous palette predictor (e.g., 400) and one or more values associated with the current palette coding block (e.g., new color values New_$C_1$, New_$C_2$, and New_$C_M$ in entries 424-430 in predictor palette 400). In some examples, the one or more reused values can be determined based on signaled information including reuse indicators (e.g., reuse vector 410). In some cases, the reuse indicators can include one or more bits or flags indicating whether color information from one or more respective entries in the previous palette predictor should be reused.

In some implementations, the processes (or methods) described herein (including process 800) can be performed by one or more computing devices or apparatuses, such as the system 100 shown in FIG. 1. For example, the processes can be performed by the encoding device 104 shown in FIGS. 1 and 9, by another video source-side device or video transmission device, by the decoding device 112 shown in FIGS. 1 and 10, and/or by another device, such as a player device, a display, or any other device. In some cases, the computing device or apparatus may include one or more input devices, one or more output devices, one or more processors, one or more microprocessors, one or more microcomputers, and/or other component(s) that is/are configured to carry out the steps of process 800.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Additional details of the encoding device 104 and the decoding device 112 are shown in FIG. 9 and FIG. 10, respectively. FIG. 9 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes. Encoding device 104 may perform palette coding operations as described herein.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 9 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 9, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 9 represents an example of a video encoder configured to perform any of the techniques described herein, including the process described above with respect to FIG. 8. In some cases, some of the techniques of this disclosure may also be implemented by post processing device 57.

FIG. 10 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 9.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 10 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 10 represents an example of a video decoder configured to perform any of the techniques described herein, including the process described above with respect to FIG. 8.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of coding video data, the method comprising:
   determining a current palette coding block of a single tree coded slice of a picture is encoded according to a local dual tree;
   determining, after an update of a palette predictor associated with the current palette coding block, a first number of palette predictor entries for a first image component of the current palette coding block and a second number of palette predictor entries for a second image component of the current palette coding block;
   determining the first number of palette predictor entries is greater than the second number of palette predictor entries; and
   based on the determining that the first number of palette predictor entries is greater than the second number of palette predictor entries, modifying the updated palette predictor to include a same number of palette predictor entries for the first image component and the second image component.

2. The method of claim 1, wherein modifying the updated palette predictor comprises:
   adding, to the updated palette predictor, one or more palette predictor entries for the second image component, the one or more palette predictor entries comprising one or more component values calculated for the second image component.

3. The method of claim 2, further comprising:
   calculating the one or more component values for the second image component by left shifting a first integer by a second integer, the second integer comprising a result of a bit depth value for a sample from the current palette coding block minus a third integer.

4. The method of claim 3, wherein each of the first integer and the third integer equals 1, and wherein left shifting the first integer by the second integer comprises raising 2 to a power of an exponent comprising the second integer.

5. The method of claim 1, further comprising:
prior to modifying the updated palette predictor, determining the local dual tree associated with the current palette coding block corresponds to the first image component.

6. The method of claim 1, wherein the first image component comprises color components from a first color channel, and wherein the second image component comprises color components from a second color channel that is different from the first color channel.

7. The method of claim 1, wherein modifying the updated palette predictor comprises clipping the updated palette predictor to remove one or more palette predictor entries for the first image component.

8. The method of claim 1, further comprising:
determining a different palette coding block of the single tree coded slice is encoded according to a respective local dual tree; and
based on the determining the different palette coding block is encoded according to the respective local dual tree, skipping a palette predictor update for the different palette coding block.

9. The method of claim 1, wherein the palette predictor comprises a joint palette predictor that includes the first number of palette predictor entries for the first image component and the second number of palette predictor entries for the second image component.

10. The method of claim 1, wherein the palette predictor comprises a first palette predictor associated with the first image component and a second palette predictor associated with the second image component.

11. The method of claim 1, further comprising:
generating the palette predictor based on a set of values in a current palette associated with the current palette coding block.

12. The method of claim 11, further comprising:
determining the current palette based on one or more reused values from a previous palette predictor and one or more values associated with the current palette coding block.

13. The method of claim 12, wherein the one or more reused values are determined based on signaled information comprising reuse indicators.

14. An apparatus comprising:
memory; and
one or more processors coupled to the memory, the one or more processors being configured to:
determine a current palette coding block of a single tree coded slice of a picture is encoded according to a local dual tree;
determine, after an update of a palette predictor associated with the current palette coding block, a first number of palette predictor entries for a first image component of the current palette coding block and a second number of palette predictor entries for a second image component of the current palette coding block;
determine the first number of palette predictor entries is greater than the second number of palette predictor entries; and
based on the determining that the first number of palette predictor entries is greater than the second number of palette predictor entries, modify the updated palette predictor to include a same number of palette predictor entries for the first image component and the second image component.

15. The apparatus of claim 14, wherein modifying the updated palette predictor comprises:
adding, to the updated palette predictor, one or more palette predictor entries for the second image component, the one or more palette predictor entries comprising one or more component values calculated for the second image component.

16. The apparatus of claim 15, the one or more processors being configured to:
calculate the one or more component values for the second image component by left shifting a first integer by a second integer, the second integer comprising a result of a bit depth value for a sample from the current palette coding block minus a third integer.

17. The apparatus of claim 16, wherein each of the first integer and the third integer equals 1, and wherein left shifting the first integer by the second integer comprises raising 2 to a power of an exponent comprising the second integer.

18. The apparatus of claim 14, the one or more processors being configured to:
prior to modifying the updated palette predictor, determine the local dual tree associated with the current palette coding block corresponds to the first image component.

19. The apparatus of claim 14, wherein the first image component comprises color components from a first color channel, and wherein the second image component comprises color components from a second color channel that is different from the first color channel.

20. The apparatus of claim 14, wherein modifying the updated palette predictor comprises clipping the updated palette predictor to remove one or more palette predictor entries for the first image component.

21. The apparatus of claim 14, the one or more processors being configured to:
determine a different palette coding block of the single tree coded slice is encoded according to a respective local dual tree; and
based on the determining the different palette coding block is encoded according to the respective local dual tree, skip a palette predictor update for the different palette coding block.

22. The apparatus of claim 14, wherein the palette predictor comprises a joint palette predictor that includes the first number of palette predictor entries for the first image component and the second number of palette predictor entries for the second image component.

23. The apparatus of claim 14, wherein the palette predictor comprises a first palette predictor associated with the first image component and a second palette predictor associated with the second image component.

24. The apparatus of claim 14, the one or more processors being configured to:
generate the palette predictor based on a set of values in a current palette associated with the current palette coding block.

25. The apparatus of claim 24, the one or more processors being configured to:
determine the current palette based on one or more reused values from a previous palette predictor and one or more values associated with the current palette coding block.

26. The apparatus of claim 25, wherein the one or more reused values are determined based on signaled information comprising reuse indicators.

27. The apparatus of claim 14, wherein the apparatus is a mobile device.

28. The apparatus of claim 14, wherein the apparatus comprises a camera.

29. At least one non-transitory computer-readable medium having stored thereon instructions which, when executed by one or more processors, cause the one or more processors to:
- determine a current palette coding block of a single tree coded slice of a picture is encoded according to a local dual tree;
- determine, after an update of a palette predictor associated with the current palette coding block, a first number of palette predictor entries for a first image component of the current palette coding block and a second number of palette predictor entries for a second image component of the current palette coding block;
- determine the first number of palette predictor entries is greater than the second number of palette predictor entries; and
- based on the determining that the first number of palette predictor entries is greater than the second number of palette predictor entries, modify the updated palette predictor to include a same number of palette predictor entries for the first image component and the second image component.

30. The at least one non-transitory computer-readable medium of claim 29, wherein modifying the updated palette predictor comprises:
- adding, to the updated palette predictor, one or more palette predictor entries for the second image component, the one or more palette predictor entries comprising one or more component values calculated for the second image component.

* * * * *